(12) United States Patent
Li

(10) Patent No.: US 6,701,516 B1
(45) Date of Patent: Mar. 2, 2004

(54) P++ SOFTWARE

(76) Inventor: Qifang Li, 68-28 Clyde St., Forest Hills, NY (US) 11375

(*) Notice: Subject to any disclaimer, the term of this patent is extended or adjusted under 35 U.S.C. 154(b) by 651 days.

(21) Appl. No.: 09/605,642

(22) Filed: Jun. 28, 2000

Related U.S. Application Data (63) Continuation-in-part of application No. 09/081,762, filed on May 21, 1998, now abandoned.

(51) Int. Cl.[7] ............................................... G06F 9/44
(52) U.S. Cl. ........................... 717/117; 706/47; 706/55
(58) Field of Search ............................... 717/116, 117; 706/47, 55

(56) References Cited

U.S. PATENT DOCUMENTS

| | | | |
|---|---|---|---|
| 4,546,432 A | 10/1985 | Umemura et al. | 395/800.42 |
| 4,648,044 A | 3/1987 | Hardy et al. | 706/60 |
| 5,129,081 A * | 7/1992 | Kobayashi et al. | 707/1 |
| 5,274,820 A | 12/1993 | Gillett | 395/705 |
| 5,321,833 A | 6/1994 | Chang et al. | 395/600 |
| 5,386,520 A | 1/1995 | Gillett | 711/200 |
| 5,396,632 A | 3/1995 | Gillett | 395/733 |
| 5,423,041 A * | 6/1995 | Burke et al. | |
| 5,442,792 A * | 8/1995 | Chun | |
| 5,452,453 A * | 9/1995 | Ando et al. | |
| 5,488,714 A * | 1/1996 | Skidmore | |
| 5,572,670 A | 11/1996 | Puckett | 395/183.22 |
| 5,696,980 A | 12/1997 | Brew | 395/752 |
| 5,712,960 A | 1/1998 | Chiopris et al. | 395/77 |
| 5,742,806 A | 4/1998 | Reiner et al. | 395/600 |
| 5,815,717 A * | 9/1998 | Stack | |

OTHER PUBLICATIONS

"Atricial Intelligence Programming with Turbo Prolog", by Keith Weiskamp et al, pp. 1–127, 1998.*
Artificial Intelligence Programming with Turbo PROLOG, K Weiskamp et al, Table of Contents, 1988.*
CommonLoops Merging Lisp and Object–Oriented Programming, Daniel G. Bobrow et al, OOPSLA 86 Proceedings pp. 17–29, Sep. 1986.*
White, R.P., Natural Language Interface for a PROLOG Database (Master Thesis), Dec. 16, 1983, Abstract from NTIS Order No. AD–A138 071/6.

* cited by examiner

Primary Examiner—Todd Ingberg
(74) Attorney, Agent, or Firm—Richard C. Litman (57) ABSTRACT

P++ software that provides a Prolog language data storing and processing method, includes making a plurality of different application programs, introduces two structure types into arguments of clauses, implements these two structure types in predicate inputting, memory storing, processing through unification and back tracking, and outputting for each query. The first structure type is hierarchically defined and recursively processed. Its member can be a variable, a data term, or of any other structure type except itself. Its variable child member can be substituted by one of this structure type making a result in the same structure type with different length. The second structure type is recursively defined and processed. Its member can be a variable, a data term, or of any structure type including itself. It has fixed number of members. With these two structure types, addition and multiplication are extended to multi-dimensional space operations.

20 Claims, 10 Drawing Sheets

P++ SOFTWARE

CROSS REFERENCE TO RELATED APPLICATIONS

This is a continuation-in-part of application Ser. No. 09/081,762 filed on May 21, 1998 abandondoned.

BACKGROUND OF THE INVENTION

1. Field of the Invention

The present invention generally relates to improvements in Prolog software and, more particularly, to an implementation of Prolog, hereinafter referred to as P++ software, that introduces two structure types into arguments of clauses, and improves built-in Prolog predicates assert and retract. The invention also provides the ability of P++ software to perform addition, subtraction, and multiplication of matrices.

2. Description of the Related Art

Conventional programming is based on the concept of giving specific commands to the computer about how to solve a particular problem. Prolog is an example of attempts to make the process of human-computer communication significantly different in style. It tries to achieve the goal of requiring the user to describe the problem in a logically coherent and correct manner, leaving it to the computer to work out and execute the necessary steps for solving the problem. Though Prolog does not fully realize this aim, it is a significant step towards this new style of declarative or descriptive programming.

An appealing characteristic of Prolog is that the emphasis in writing a Prolog program is on specifying or describing the nature of the problem, rather than on spelling out the steps the computer should take to solve the problem, as one is required to do with conventional languages like BASIC or COBOL or Pascal. This difference, that makes Prolog markedly different, is often described by saying that Prolog is a declarative or assertional language, as contrasted with conventional languages, which are usually called imperative. The present invention is P++ software, an implementation of Prolog that introduces two structure types into arguments of clauses, and improves built-in Prolog predicates assert and retract. P++ software also extends the algebraic operations of addition, subtraction and multiplication to matrices.

The related art is represented by the following patents of interest.

U.S. Pat. No. 4,546,432, issued on Oct. 8, 1985 to Mamoru Umemura et al., describes a Prolog processing system. Umemura et al. do not suggest Prolog software according to the claimed invention.

U.S. Pat. No. 4,648,044, issued on Mar. 3, 1987 to Steven Hardy et al., describes a basic expert system tool. Hardy et al. do not suggest Prolog software according to the claimed invention.

U.S. Pat. No. 5,129,081, issued on Jul. 7, 1992 to Kenzo Kobayashi et al., describes a system for processing data using logic language. Kobayashi et al. do not suggest Prolog software according to the claimed invention.

U.S. Pat. No. 5,274,820, issued on Dec. 28, 1993 to Marc J. L. Gillett, describes a method and system for eliminating operating codes from intermediate Prolog instructions. Gillett '820 does not suggest Prolog software according to the claimed invention.

U.S. Pat. No. 5,321,833, issued on Jun. 14, 1994 to Shih-Chio Chang et al., describes a method for adaptive multilevel record ranking for full text information retrieval systems, whereby retrieved records are quantitatively ranked with respect to their relevance to the terms of a query and wherein a user specifies relevance factors for a relative weighting of the relevance factors on each level. Chang et al. do not suggest Prolog software according to the claimed invention.

U.S. Pat. No. 5,386,520, issued on Jan. 31, 1995 to Marc J. L. Gillett, describes an improved technique for processing Prolog objects. Gillett '520 does not suggest Prolog software according to the claimed invention.

U.S. Pat. No. 5,396,632, issued on Mar. 7, 1995 to Marc J. L. Gillett, describes an improved architecture for a Prolog interpreter/compiler. Gillett '632 does not suggest Prolog software according to the claimed invention.

U.S. Pat. No. 5,572,670, issued on Nov. 5, 1996 to Timothy L. Puckett, describes a method and apparatus for translation between low level data records having both interrelated time dependencies and having a large plurality of varying formats, and high level data having English, English-like or, more generally, natural language terms where statements or this latter data are not interrelated by time dependencies and such that the data format is substantially fixed and uniform. Puckett does not suggest Prolog software according to the claimed invention.

U.S. Pat. No. 5,696,980, issued on Dec. 9, 1997 to Christopher H. Brew, describes a machine translation system which operates by analyzing a source text to deduce information about the usage and meaning of the words of a source language text as they occur in context. Brew does not suggest Prolog software according to the claimed invention.

U.S. Pat. No. 5,712,960, issued on Jan. 27, 1998 to Carlo Chiopris et al., describes a system and method for intelligent database management using abductive reasoning. Chiopris et al. do not suggest Prolog software according to the claimed invention.

U.S. Pat. No. 5,742,806, issued on Apr. 21, 1998 to David Reiner et al., describes an improved architecture for a Prolog interpreter/compiler. Reiner et al. do not suggest Prolog software according to the claimed invention.

The abstract from a master thesis by R. P. White, entitled Natural Language Interface for a PROLOG Database, published on Dec. 16, 1983, describes a natural language interface to a relational database wherein careful attention was given to the human factors needed to aid a novice user in accessing data. The White abstract does not suggest Prolog software according to the claimed invention.

None of the above inventions and patents, taken either singularly or in combination, is seen to describe the instant invention as claimed.

SUMMARY OF THE INVENTION

The present invention is P++ software, an implementation of Prolog that introduces two structure types into arguments of clauses, and improves the built-in Prolog predicates assert and retract. P++ software adds structure types Tuple and Phrase to Prolog. These two structure types are logically the same as List in Prolog. They require lexical analysis, engine storage, unification, and output. The structure types Tuple and Phrase each require a counterpart for everything that is done for List. The changes are extensive.

Phrase is defined as a sequence of Terms. One space separates two Terms. A Phrase can be instantiated, or unified as a single Term or as a sequence of Terms of its length. A Phrase can be inserted into another Phrase. The result is a Phrase. The Functor of the Phrase is defined as ' . . '. The Arity of the Phrase is defined as the count of Terms in the sequence. The Functor of an expression with operators can be viewed firstly as an outmost one in the expression just as in Prolog, and secondly as the Functor of a Phrase. The argument also has two meanings when referring to argument 1 or argument 2. The Arity of a Phrase can be changed if it contains a variable and which may later be instantiated to another Phrase. A Phrase is useful for processing a natural language and performing linguistic analysis.

Tuple is defined as a sequence of Terms separated by commas and the sequence is enclosed by parentheses. A Tuple can be instantiated or unified singly or component wisely. The Functor of a Tuple is defined as ' . . . '. The Arity of a Tuple is defined as a count of Terms in the sequence within its parentheses. If an expression with operators is in parentheses, it is considered as a Phrase inside a Tuple. Unlike Phrase and List, the number of members in a Tuple never changes. This property is useful in a database application. The two new structure types Phrase and Tuple are on the same level as List and Compound Term which are structure types in Prolog. These four structure types can be combined and used up to the order as high as the resource allows. Hence users have more formats to store and retrieve data for practical use.

The present invention provides the ability of P++ software to perform addition, subtraction, and multiplication of matrices. A row matrix has the form (T1, T2, . . . , TN) where each Ti is a term. The dimension of this row matrix is 1 by N. A column matrix has the form ((T1) (T2) . . . (TM)) where each Ti is a term. The dimension of this column matrix is M by 1. An M by N matrix is a special Tuple. It has the form (ROW1 ROW2 . . . ROWM) where each ROWi is a row matrix of dimension 1 by N. The multiplication result of X and Y is returned in the following way: (1) if X is a number and Y is a number, a number is returned; (2) if X is a constant and Y is a matrix of m by n, a matrix of m by n is returned; (3) if X is a matrix of m by n and Y is a constant, a matrix of m by n is returned; (4) if X is a matrix of m by k and Y is a matrix of k by n, a matrix of m by n is returned; (5) otherwise, nothing is changed. The numerical sum of X and Y is returned only if X and Y are both instantiated to numbers. If X and Y are matrices of the same dimension, the matrix addition is performed and the result matrix is returned. In any other case nothing is changed. The numerical difference of X and Y is returned only if X and Y are both instantiated to numbers. If X and Y are matrices of the same dimension, the matrix subtraction is performed and the result matrix is returned. In any other case nothing is changed.

The built-in Prolog predicate assert is changed and enhanced as follows. Each goal in the added rule can be instantiated right before the rule is added. The flexibility is that the added rule is not decided at design time but at run time. In asserta (H,B1,B2, . . . ,Bn) the clause to be added is of the form "H:-B1,B2,. . . ,Bn." as a rule or "H." as a fact. H composes the head of the clause and the rest of the arguments B1,B2, . . . Bn form the body of the clause. The goal fails if an argument is not instantiated to a compound term or an atom, otherwise it succeeds. If the clause to be added is not the same as the first one in the database then it is added to the beginning of the database. In case that ";" or "→" is needed, it is put as an argument in single quotes. It can only be used in a directive, or a query, or the body of a rule, e.g., ":-asserta(h(X),X=1,';',X=2)." asserts the rule "h(X):-X=1;X=2." to the database of the predicate h with Arity 1.

In "asserti(ith,H,B1,B2, . . . ,Bn)." the clause to be added is of the form "H:-B1,B2, . . . Bn." as a rule or "H." as a fact. The first argument ith is the index and it ranges from 1 to the index of the current last clause. The goal fails if this argument is not a number or is not in the range. H composes the head of the clause and the rest of the arguments B1,B2, . . . Bn form the body of the clause. The goal fails if any of H,B1, . . . ,Bn is not instantiated to a compound term or an atom, otherwise it succeeds. If the clause to be added is not the same as the ith one in the database then it is added to the ith place of the database. In case that ";" or "→" is needed, it is put as an argument in single quotes. It can only be used as a directive, or a query, or the body of a rule, e.g., ":-asserti(2,h(X),X=1,';',X=2)." asserts the rule "h(X):-X=1;X=2." to the second place of the database of the predicate h with arity 1. Here it is assumed that at least one such clause already exists.

In assertz(H,B1,B2, . . . ,Bn) the clause to be added is of the form "H:-B1,B2, . . . ,Bn." as a rule or "H." as a fact. H composes the head of the clause and the rest of the arguments B1,B2, . . . ,Bn form the body of the clause. The goal fails if an argument is not instantiated to a compound term or an atom, otherwise it succeeds. If the clause to be added is not the same as the last one in the database then it is added to the end of the database. In case that ";" or "→" is needed, it is put as an argument in single quotes. It can only be used in a directive, or a query, or the body of a rule, e.g., ":-assertz(h(X),X=1,';',X=2)." asserts the rule "h(X):-X=1;X=2." to the end of the database of the predicate h with Arity 1.

P++ software keeps retracta/1 and retractz/1 the same as ANSI Prolog 13211-1. One enhancement occurs in the form of retracti(ith,X). The first argument ith is the index and it ranges from 1 to the index of the current last clause. The goal fails if this argument is not a number or is not in the range. X must be instantiated to the form name/arity, otherwise it fails. It also fails if no such clause exists in the database. This goal removes the ith clause (in the database) of the name and the Arity. It can only be used in a directive, or a query, or the body of a rule. Another enhancement occurs in the form of retract (H,B1,B2, . . . ,Bn) The clause to be retracted is of the form "H:-B1,B2, . . . ,Bn." as a rule or "H." as a fact. H composes the head of the clause and the rest of the arguments B1,B2 . . . ,Bn form the body of the clause. The goal fails if an argument is not instantiated to a compound term or an atom. The goal succeeds if there exists a clause in the database which is the same as the one to be retracted. Only the first matched clause is retracted. It fails if no such clause exists. In case that ";" or "→" is needed, it is put as and argument in single quotes. It can only be used in a directive, or a query, or the body of a rule.

Accordingly, it is a principal object of the invention to provide an implementation of Prolog software that adds a new structure type, adds a modified structure type, and improves built-in Prolog predicates assert and retract.

It is another object of the invention to provide an implementation of Prolog software that extends the algebraic operations of addition, subtraction and multiplication to matrices.

It is an object of the invention to provide improved elements and arrangements thereof in an implementation of Prolog software for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention is P++ software, an implementation of Prolog that introduces two structure types into arguments of clauses, and improves the built-in predicates assert and retract. P++ software adds structure types Tuple and Phrase to Prolog. These two structure types are logically the same as List in Prolog. P++ software also extends the algebraic operations of addition, subtraction and multiplication to matrices.

The programming language Prolog was invented by Alain Colmerauer and his associates around 1970. It was a first attempt. at the design of a practical programming language that would enable a programmer to specify his tasks in logic, instead of in terms of conventional programming constructs about what the machine should do when. This motivation explains the name of the programming language, for Prolog stands for Programming in Logic. Logic was originally devised as a way of representing the form of arguments, so that it would be possible to check in a formal way whether or not they were valid. Thus one can use logic to express propositions, the relations between propositions and how one can validly infer some propositions from others.

Prolog includes predicates and arguments. Arguments are objects connected by a predicate. Each example or instance of a predicate is called a clause. There are two different types of clauses, called facts and rules. The names given to predicates normally begin with lowercase letters. A sequence of letters, beginning with a lowercase letter, is called an atom.

Figure 1:
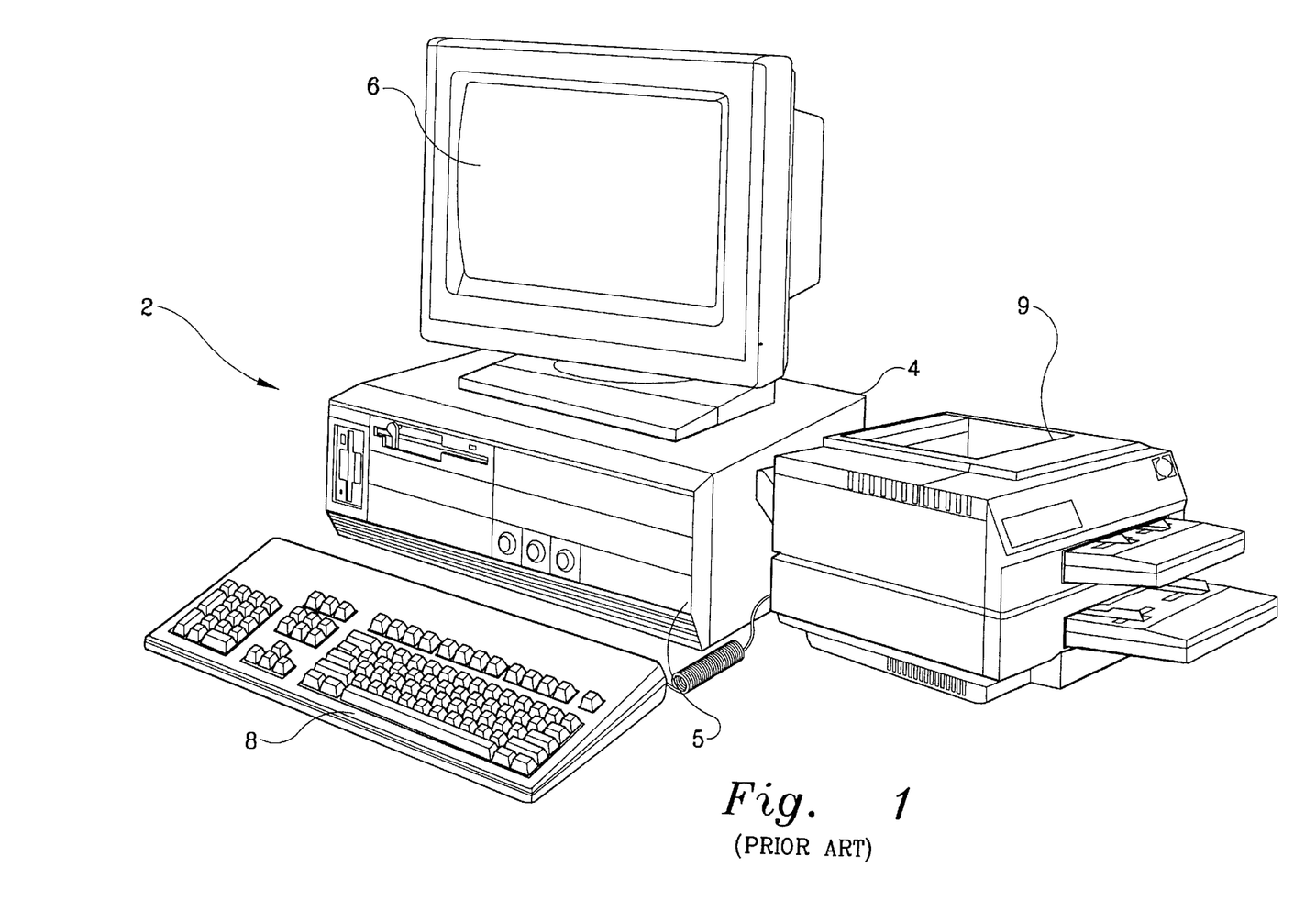
FIG. 1 is a pictorial diagram of a personal computer on which P++ is run.

There is shown in FIG. 1 a personal computer for executing the P++ software according to the invention. The personal computer generally designated 2 is of conventional construction and has a central unit 4 including a microprocessor and random access memory along with one or more floppy disk drives for receiving computer programs and data to be executed and processed by the microprocessor. To run a program, for example, a floppy disk is inserted in a slot in the front 5 of the central unit 4. In order for the user to interact with the computer when a program is being run, the computer 2 includes a cathode ray tube 6 display for showing the user intermediate results and prompting the user for data to be entered via a keyboard 8. To provide a permanent record or listing of data when a computer program is run, a printer 9 is also provided.

Figure 2:
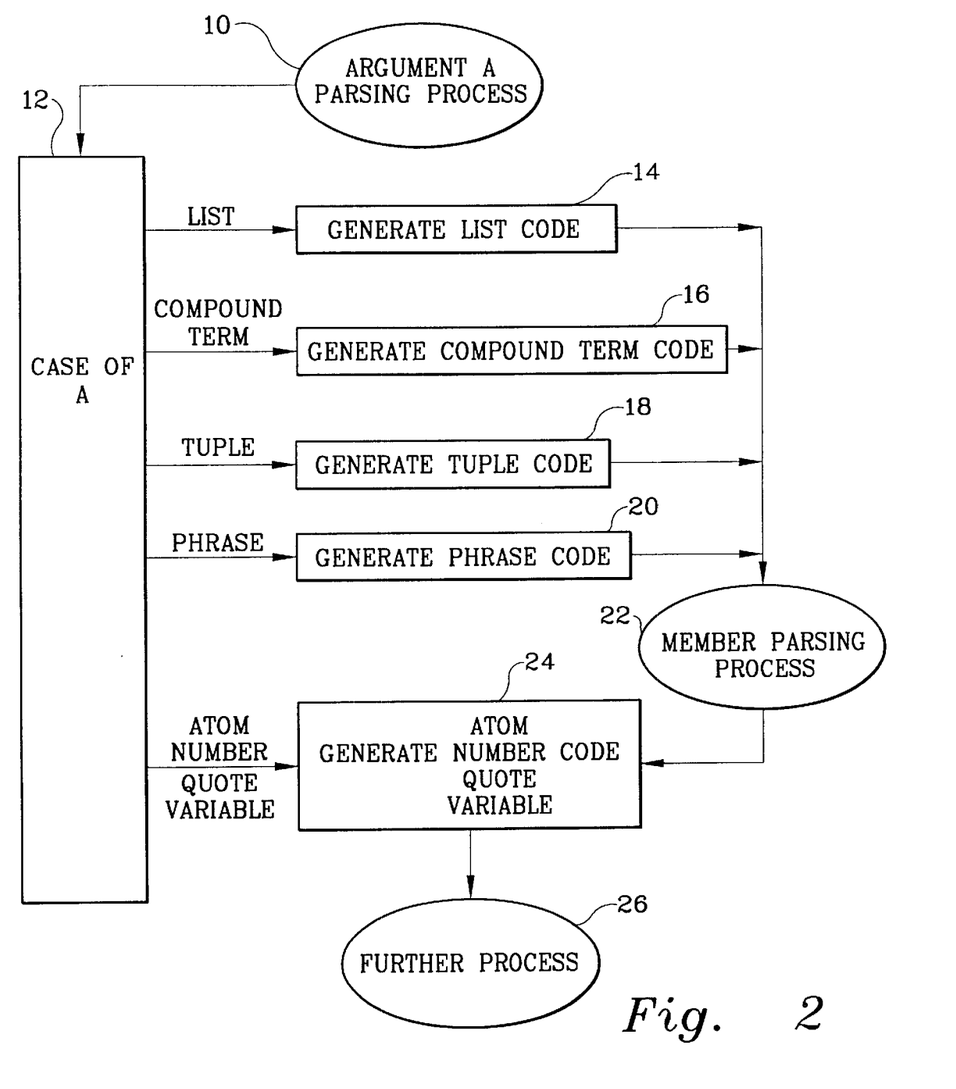
FIG. 2 is a flow chart of a parsing process according to the invention.
Figure 3A:
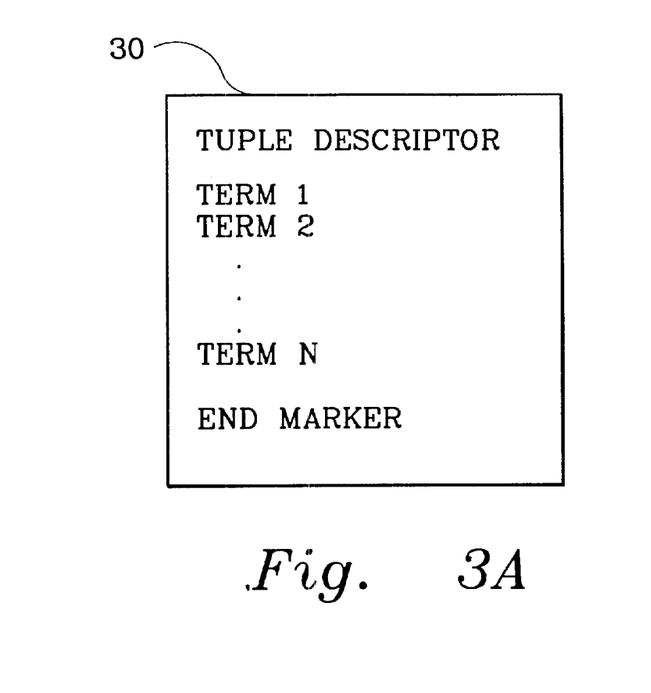
FIG. 3A is a block diagram of virtual storage of Tuple structure types.
Figure 3B:
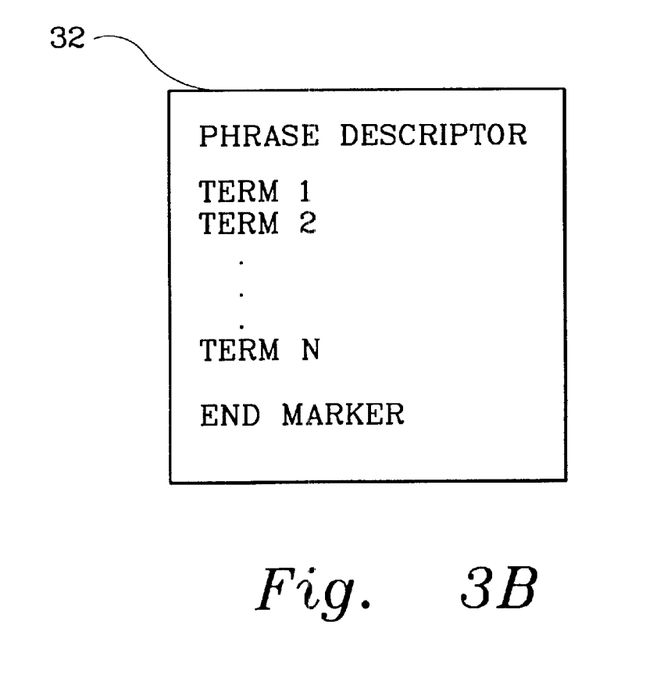
FIG. 3B is a block diagram of virtual storage of Phrase structure types.
Figure 4:
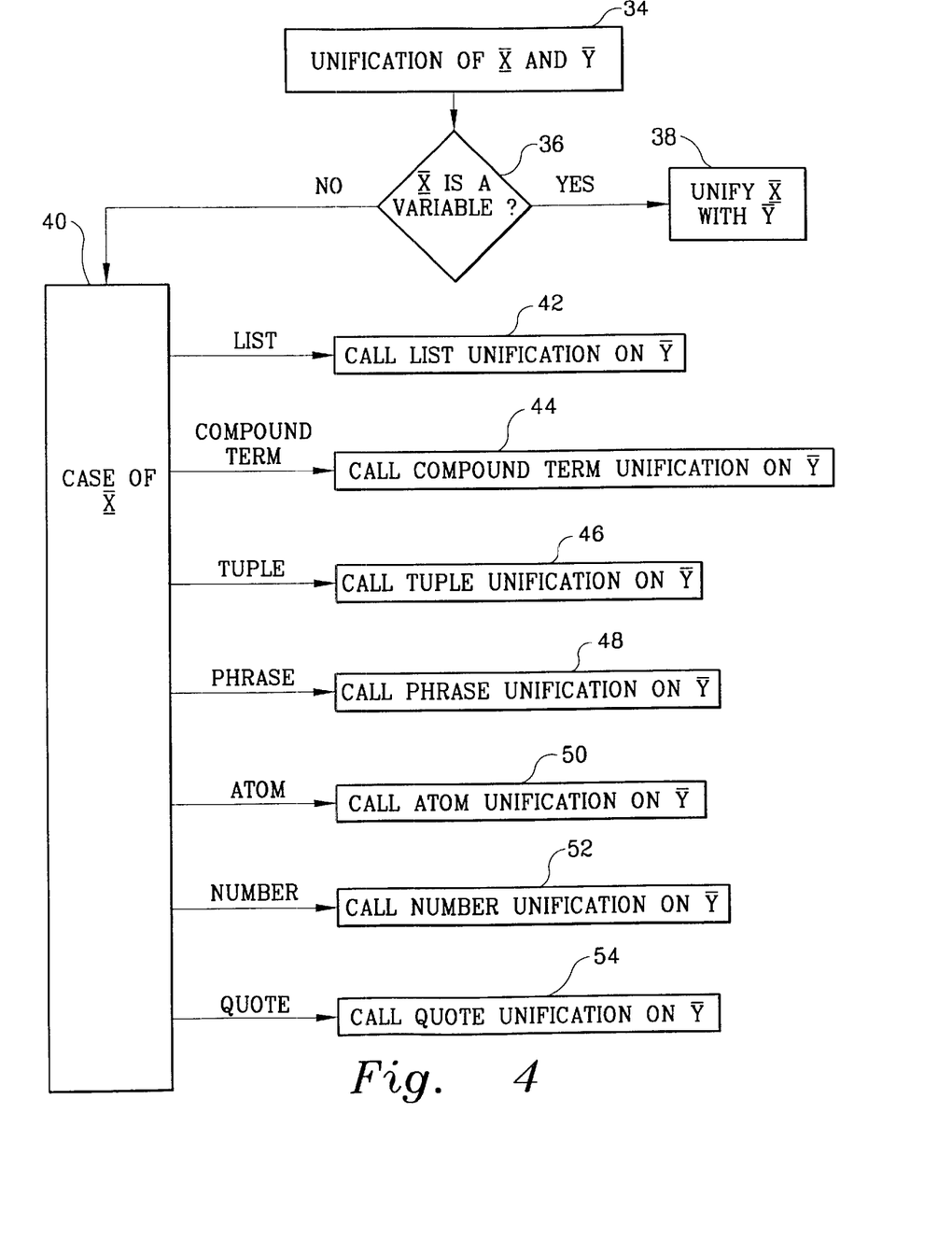
FIG. 4 is a flow chart of a unification according to the invention.

P++ software adds structure types Tuple and Phrase to Prolog in the form shown in FIGS. 3A and 3B. These two structure types are logically the same as List in Prolog. They require lexical analysis, engine storage, unification, and output. The structure types Tuple and Phrase each require a counterpart for everything that is done for List. The changes are extensive. FIG. 2 shows a general flow chart of a parsing process that refers to the structure types List, Compound Term, Tuple, and Phrase.

The structure type Phrase is hierarchically defined so that each of its members can be of any structure type or any other hierarchical structure type except itself. The structure type Phrase is defined as a sequence of Terms. One space separates two Terms. A Phrase can be instantiated or unified as a single Term or as a sequence of Terms of its length. A Phrase can be inserted into another Phrase. The result is a Phrase. A Phrase is useful for processing a natural language and performing linguistic analysis. The following are contents showing the use of a Phrase on a P++ software run interface.

hello (happy new year).
?-hello (X).
X=happy new year
**yes
?-hello(X Y Z).
X=happy
Y=new
Z=year
**yes
?-hello(happy X Y).
X=new
Y=year
**yes The Functor of the Phrase is defined as two successive periods in quotes, i.e. ' . . '. The Arity of the Phrase is defined as the count of Terms in the sequence, e.g., ?-functor(happy new year,F,N).
F=' . . '
N=3
**yes The Functor of an expression with operators can be viewed firstly as an outmost one in the expression just as in Prolog, and secondly as the Functor of a Phrase. The argument also has two meanings when referring to argument 1 or argument 2, e.g., ?-functor(a+b*c,T,A).
T=+
A=2
**yes
T' . . '
A=5
**yes
?-arg(2,a+b*c,X).
X=b*c
**yes
X=+

\*\*yes
?-arg(3,a+b\*c,X).
X=b
\*\*yes

Figure 8:
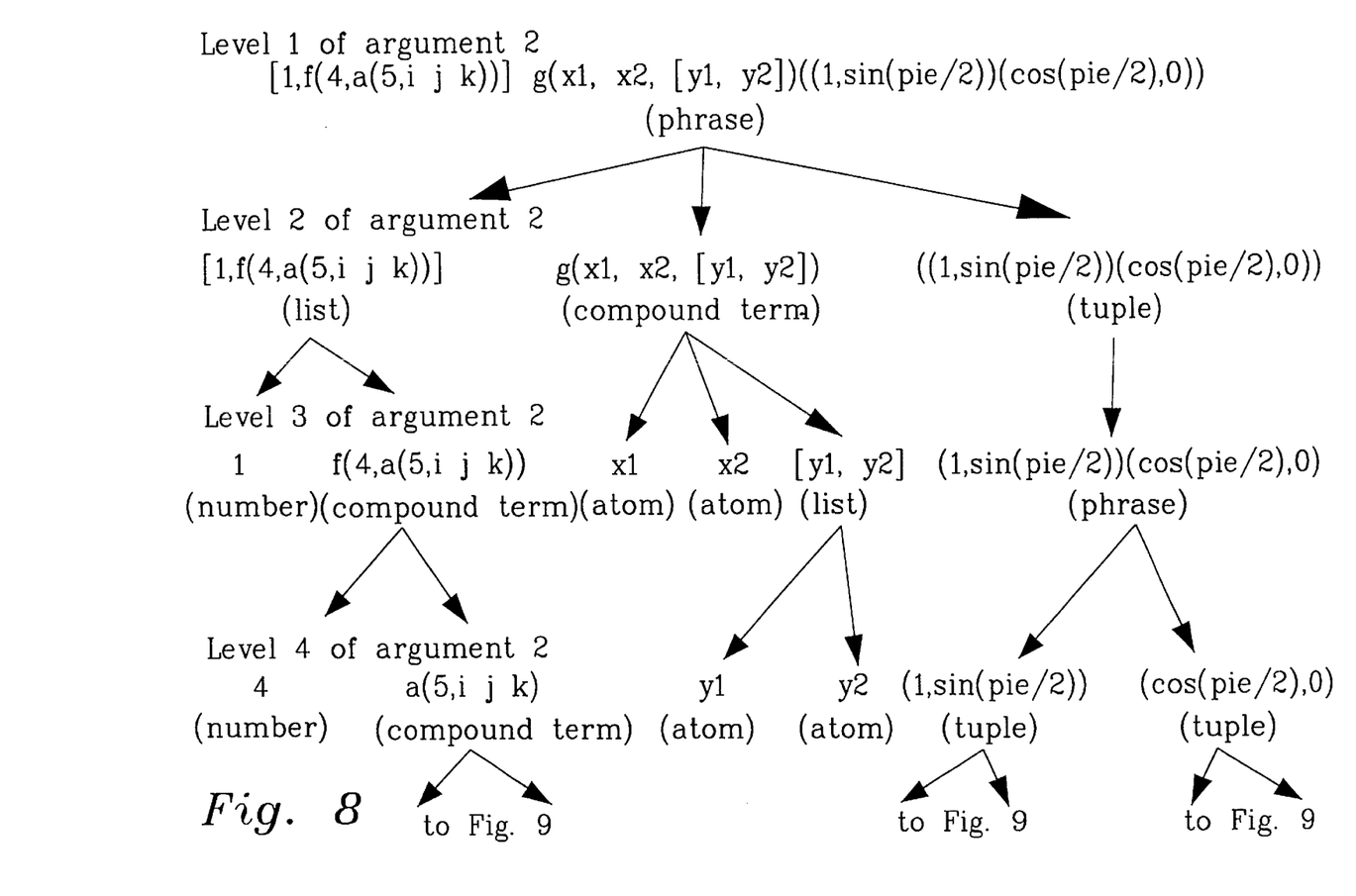
FIG. 8 and FIG. 9 show an example of a phrase structure type including three arguments according to the invention.
Figure 9:
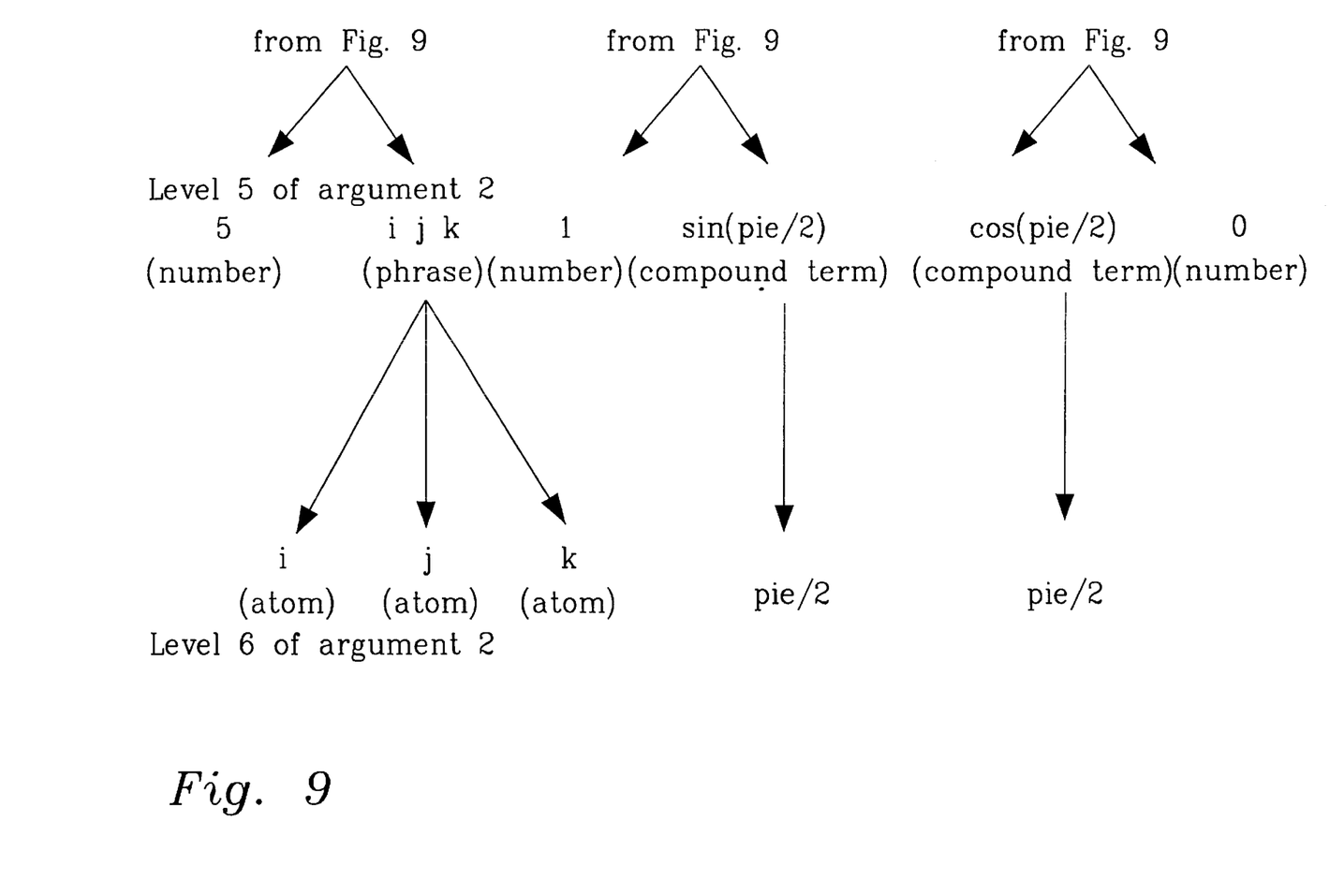

The Arity of a Phrase can be changed if it contains a variable and which may later be instantiated to another Phrase, e.g., have(a lot of book).
have(one car).
howmany(I,Length):-have (X),I=i have X,functor (I,F, Length).
?-howmany(I,Length).
I=i have a lot of book
Length=6
\*\*yes
I=i have one car
Length=4
\*\*yes FIGS. 8 and 9 shows the hierarchical structure of the second argument of an example of a Phrase structure type, set forth as (hello there, [1, f(4,a(5, i j k))] g(x1, x2, [y1, y2]) (1, sin(pie/2) (cos(pie/2), 0)).

In the predicate of the example, argument 1 is of the Phrase structure type and argument 2 is of the Pharse structure type. The three immediate members of argument 2 are of list structure type, compound term structure type, and tuple structure type, respectively. These three members are all hierarchical structure. types. In FIG. 8, the second argument of the predicate example is [1,f(4,a(5,ijk))]g(x1,x1,x2,[y1, y2])((1,sin(pie/2)) (cos(pie/2),0))). This is a Phrase structure type. It has three members. The first member [1,f(4,a(5,ijk))] is a list of two elements. The second member g(x1,x2,[y1, y2]) is the compound term g/3. The third member ((1, sin(pie/2))(cos(pie/2), 0))) is of tuple structure type. In FIG. 9, Level 5 of argument 2 includes the member i j k which is of phrase structure type and is deep in a hierarchical structure. Also, i j k is an immediate member of compound term a/2.

Variable(s) can be member(s) of a Phrase structure type and can be substituted by one in Phrase structure type making a result in Phrase structure type with different length. For example, in the example ex_2(W, you may want to know W) the second argument "you may want to know W" is of the Phrase structure type with length 6. After a first query "?-ex_2(what is in the book, Result1).", "you may want to know W" of length 6 becomes the phase "you may want to know what is in the book" of length 10. The variable Result1 is instantiated with this phrase and is an output for further programming use. Notice that in the real situation the input to the query, "what is in the book", might be obtained from previous programming code. After a second query "?-ex_ 2(entries in ((1,3,sin(2))(10,11,12)), Result2).", "you may want to know W" a of length 6 becomes a phrase like "you may want to know entries in ((1,3,sin(2))(10,11,12))" of length 8. The variable Result2 is instantiated with this phrase and is an output for further programming use. Notice that a hierarchical structure of tuple structure type, ((1,3,sin(2)) (10,11,12)), is involved as a part of input to the second query. Similarly, it might be obtained from previous programming code.

The Phrase structure type is recursively processed so that any variable residing in its members at any level within a hierarchical structure can be substituted, either by one of its own type or replaced by others through instantiation. In the example ex_3(X,X in [1,2,f(2\*X)] and k(a,b,g(X+X)), In a first query "?-ex_3(input value, Y)." it is seen that X, which is inside "X in [1,2,f(2\*X)] and k(a,b,g(X+X))", is substituted by "input value" which is of Phrase structure type. Notice that the substitution can go deep inside any hierarchical structure. This is the effect of recursive processing. In this example hierarchical structures are f(2\*X) and k(a,b,g (X+X)). In a second query "?-ex_3(((1,0)(0,-1)),W).", it is seen that X inside "X in [1,2,f(2\*X)] and k(a,b,g(X+X))" is substituted by a hierarchical structure "((1,0)(0,-1))" which is a two by two matrix defined in the software and is of the Tuple structure type. Notice that the substitution can go deep inside hierarchical structures. This is the effect of recursive processing.

Tuple is defined as a sequence of Terms separated by commas and the sequence is enclosed by parentheses. A Tuple can be instantiated or unified singly or componentwisely, e.g., row((1,2,3,4)).
?-row(X).
X=(1,2,3,4)
\*\*yes
?-row((X1,X2,X3,X4)).
X1=1
X2=2
X3=3
X4=4
\*\*yes The Functor of a Tuple is defined as three successive periods in quotes, i.e. ' ... '. The Arity of a Tuple is defined as a count of Terms in the sequence within its parentheses, e.g., ?-functor((red, blue, white, yellow), F,N).
F=' ... '
N=4
\*\*yes If an expression with operators is in parentheses, it is considered as a Phrase inside a Tuple. It is simply a Tuple only, e.g., ?-functor((a+b\*c),F,N).
F=' ... '
N=1
\*\*yes Unlike Phrase and List, the number of members in the Tuple never changes. This property is useful in a database application. The two new structure types Phrase and Tuple are on the same level as list and compound term which are structure types in Prolog. These four structure types can be combined and used up to the order as high as the resource allows. Hence users have more formats to store and retrieve data for practical use.

Figure 7:
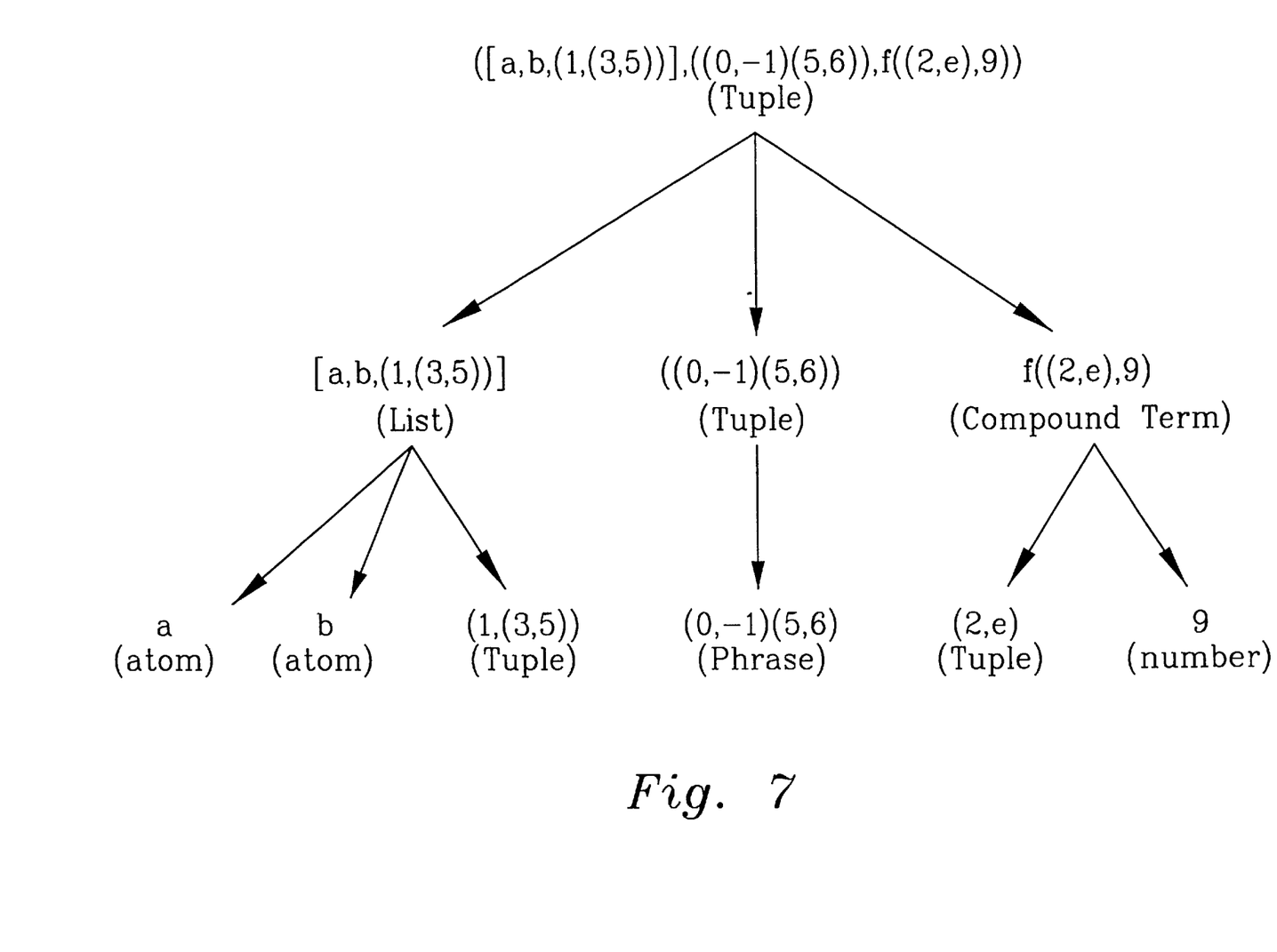
FIG. 7 is an example of a tuple structure type including three arguments according to the invention.

The Tuple structure type is recursively defined so that each of its member can be of any structure type including itself. It can be a member or members of any other hierarchical structure type including itself. As shown in FIG. 7, in the example ex_4(10, ([a,b, (1, (3,5))], ((0,-1)(5,6)), f((2, e),9))), the second argument (parameter) of the predicate is of the Tuple structure type. It has three members which are all hierarchical structures. The first member is of list structure type. The second member is of its own structure type, the Tuple structure type (this is what recursively defined means). The third member is compound term f/2. As also shown in FIG. 7, it is seen that Tuple (1, (3,5)) is a member of list [a,b,(1,(3,5))] which is a hierarchical structure, and Tuple (2,e) is a member of compound term f/2 which is also a hierarchical structure.

The Tuple structure type software is recursively processed so that any variable residing in its members at any level within a hierarchical structure can be substituted or replaced by others through instantiation. Each specific structure in this structure type has fixed length throughout inputting, storing, processing, and outputting. For example, in the predicate ex_5(X,([a,b,(1,f(3*X))], ((0,−1)X), g(k(X*e), 9))), the second argument is ([a,b, (1,f(3*X))], ((0,−1)X), g(k(X*e),9)) which is of Tuple structure type. It has three members all in hierarchical structures. The variable X resides in all three members somewhere in the hierarchical structures. With a first query "?-ex_5(trigfun(pie/3,0),Y).", the variable X is replaced with the compound term "trigfun (pie/3,0)" and Y is instantiated to the tuple with X substituted by "trigfun(pie/3,0)". Notice that the length of the tuple is always three. In a second query "?-ex_5((1,2),Z).", the variable X is replaced with (1,2) which is of Tuple structure type. Similarly as with the first query, it is seen that the substitution can go through hierarchical structures and the length of the Tuple remains three.

P++ software provides the ability of Prolog to perform addition, subtraction, and multiplication of matrices. A row matrix has the form (T1, T2, . . . ,TN) where each Ti is a term. The dimension of this row matrix is 1 by N. A column matrix has the form ((T1) (T2) . . . (TM)) where each Ti is a term. The dimension of this column matrix is M by 1. An M by N matrix is a special Tuple. It has the form (ROW1 ROW2 . . . ROWM) where each ROWi is a row matrix of dimension 1 by N.

Figure 6:
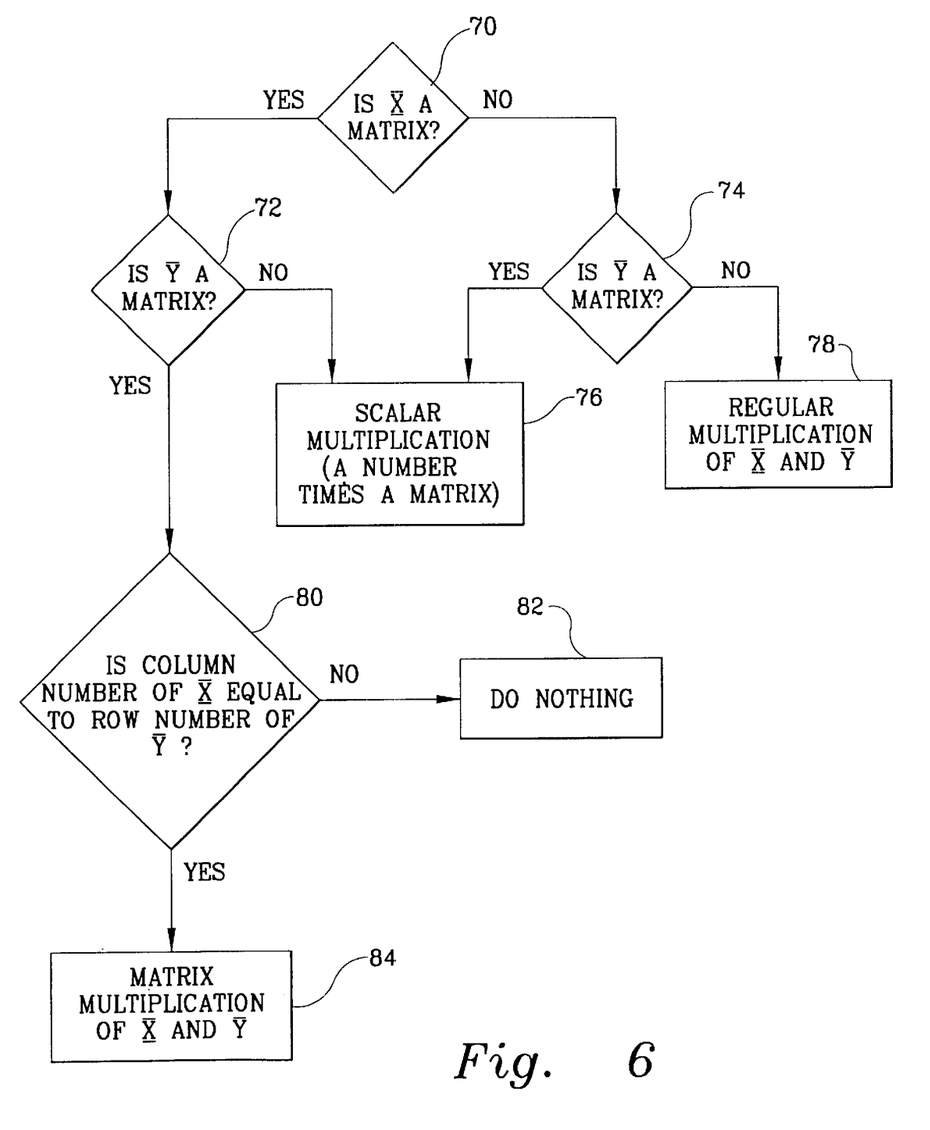
FIG. 6 is a flow chart of matrix multiplication according to the invention.

The multiplication result of X and Y is generally shown in FIG. 6 and is returned in the following way: (1) if X is a number and Y is a number, a number is returned; (2) if X is a constant and Y is a matrix of m by n, a matrix of m by n is returned; (3) if X is a matrix of m by n and Y is a constant, a matrix of m by n is returned; (4) if X is a matrix of m by k and Y is a matrix of k by n, a matrix of m by n is returned; (5) otherwise, nothing is changed. The numerical sum of X and Y is returned only if X and Y are both instantiated to numbers. If X and Y are matrices of the same dimension, the matrix addition is performed and the result matrix is returned. In any other case nothing is changed. The numerical difference of X and Y is returned only if X and Y are both instantiated to numbers. If X and Y are matrices of the same dimension, the matrix subtraction is performed and the result matrix is returned. In any other case nothing is changed.

Figure 5:
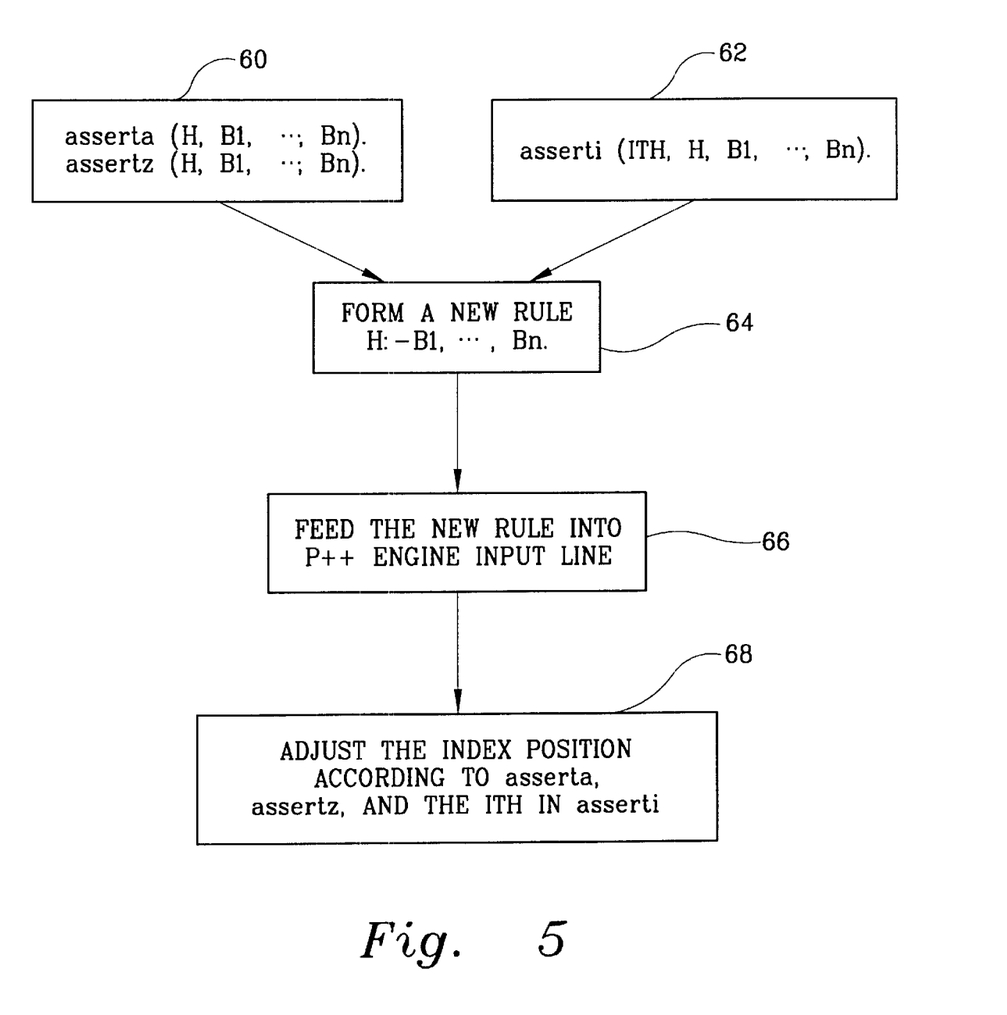
FIG. 5 is a flow chart of the predicate assert according to the invention.

The built-in Prolog predicate assert is changed and enhanced as follows. A flow chart generally showing the modified predicate assert is shown in FIG. 5. Each goal in the added rule can be instantiated right before the rule is added. The flexibility is that the added rule is not decided at design time but at run time. In asserta(H,B1,B2, . . . ,Bn) the clause to be added is of the form "H:-B1,B2, . . . ,Bn." as a rule or "H." as a fact. H composes the head of the clause and the rest of the arguments B1,B2, . . . Bn form the body of the clause. The goal fails if an argument is not instantiated to a compound term or an atom, otherwise it succeeds. If the clause to be added is not the same as the first one in the database then it is added to the beginning of the database. In case that ";" or "→" is needed, it is put as an argument in single quotes. It can only be used in a directive, or a query, or a body of a rule, e.g., ":-asserta(h(X),X=1,';',X=2)." asserts the rule "h(X):-X=1;X=2." to the database of the predicate h with Arity 1.

In "asserti(ith,H,B1,B2, . . . ,Bn)." the clause to be added is of the form "H:-B1,B2, . . . Bn." as a rule or "H." as a fact. The first argument ith is the index and it ranges from 1 to the index of the current last clause. The goal fails if this argument is not a number or is not in the range. H composes the head of the clause and the rest of the arguments B1,B2, . . . Bn form the body of the clause. The goal fails if any of H,B1, . . . ,Bn is not instantiated to a compound term or an atom, otherwise it succeeds. If the clause to be added is not the same as the ith one in the database then it is added to the ith place of the database. In case that ";" or "→" is needed, it is put as an argument in single quotes. It can only be used as a directive, or a query, or the body of a rule, e.g., ":-asserti(2,h(X),X=1,';',X=2)." asserts the rule "h(X):-X=1;X=2." to the second place of the database of the predicate h with Arity 1. Here it is assumed that at least one such clause already exists.

In assertz(H,B1,B2, . . . ,Bn) the clause to be added is of the form "H:-B1,B2, . . . ,Bn." as a rule or "H." as a fact. H composes the head of the clause and the rest of the arguments B1,B2, . . . ,Bn form the body of the clause. The goal fails if an argument is not instantiated to a compound term or an atom, otherwise it succeeds. If the clause to be added is not the same as the last one in the database then it is added to the end of the database. In case that ";" or "→" is needed, it is put as an argument in single quotes. It can only be used in a directive, or a query, or the body of a rule, e.g., ":-assertz(h(X),X=1,';',X=2)." asserts the rule "h(X):-X= 1;X=2." to the end of the database of the predicate h with Arity 1.

P++ software keeps retracta/1 and retractz/1 the same as ANSI Prolog 13211-1. One enhancement occurs in the form of retracti(ith,X). The first argument ith is the index and it ranges from 1 to the index of the current last clause. The goal fails if this argument is not a number or is not in the range. X must be instantiated to the form name/arity, otherwise it fails. It also fails if no such clause exists in the database. This goal removes the ith clause (in the database) of the name and the Arity. It can only be used in a directive, or a query, or the body of a rule. Another enhancement occurs in the form of retract (H,B1,B2, . . . ,Bn) The clause to be retracted is of the form "H:-B1,B2, . . . ,Bn." as a rule or "H." as a fact. H composes the head of the clause and the rest of the arguments B1,B2 . . . ,Bn form the body of the clause. The goal fails if an argument is not instantiated to a compound term or an atom. The goal succeeds if there exists a clause in the database which is the same as the one to be retracted. Only the first matched clause is retracted. It fails if no such clause exists. In case that ";" or "→" is needed, it is put as an argument in single quotes. It can only be used in a directive, or a query, or the body of a rule.

The predefined predicate asserti provides indexed insertion for a collection of predicate style clauses so that any clause with the same name and the same number of arguments as the collection can be inserted into the collection at any position from the first to the last of the collection.

If The predefined predicate retracti provides indexed deletion so that in a collection of predicate style clauses with the same name and the same number of arguments, anyone ranging from the first position to the last position can be deleted.

In Prolog the order of clauses matters. For example, the most frequently used predefined predicate is append. It has two clauses as in the following.

append([ ],L,L).
append([X¦L1], L2, [X¦L3]):-append(L1, L2, L3).

The order of these two clauses has to be exactly like this. Otherwise the consequence is unpredictable. These two clauses form a collection with "append" as the name and 3 as the number of is arguments.

The following example shows the simplest situation that is needed to use asserti and retracti. The management office of an apartment building has a waiting list for upcoming customers on a base of "First come first serve". The example is as follows:

ex_6(bob, [studio,efficiency,1]).
ex_6(jack, [1,2]).
ex_6(john, [3,2]).
ex_6(linda, [1,studio]).
ex_6(jim, [1]).
ex_6(jerry, [1,2,3]).
ex_6(henry, [studio, 1,2]).
ex_6(nancy, [2,1]).
ex_6(mary, [studio,2]).
ex_6(jeffery, [2]).

The database is kept in a predicate with name "ex_6" and two arguments. The first argument is for the name of customers. The second argument consists of preferences a costumer has signed up for renting. The first customer gets the turn whenever an apartment in his/her preferences becomes available. There are ten people in the waiting list as shown in the example. These ten clauses form a collection with the same name and the number of argument. Now, Henry calls and says that he has changed his mind. He would prefer 1 bedroom to a studio. Also he says he is no longer interested in a two-bedroom apartment. Suppose that it is already known that he is seventh in the waiting list. The task now is to take the old sign-up away and insert in the new one at the seventh place. This task may be critical for some intelligent application. Unfortunately, there is no predefined predicate available in ISO/IEC Prolog to deal with this situation. In P++ software, if one calls up retracti and then asserti with 7 as the first argument in both clauses, it can be done. The next two lines show how to do that.

:-retracti(7,ex_6/2).
:-asserti(7,ex_6(henry,[1,studio])).

In the example the first clause in the query, ex_6(henry, Before), is to check Henry's preferences for housing before retracti and asserti are called. It is seen that in the result the variable "Before" is instantiated to [studio,1,2] which contains Henry's last preferences. The second and third clauses in the query are retracti and asserti. Notice both of them have 7 as their first argument. The last clause in the query, ex_6(henry, After), is to check Henry's preferences after retracti and asserti are called it is seen that in the result the variable "After" is instantiated to Henry's current preferences. Furthermore, if one queries the database with "?-ex_6(X,Y).", it will be seen that Henry is still #7 in the waiting list.

Predefined predicates retracta and retractz are built in so that only the name of predicate and the number of arguments are needed to delete a predicate.

There is no predicate like retracta or retractz in ISO/IEC Prolog. To be able to change, add, and remove programming code is the feature which makes Prolog unique. No procedural language can do so. The predicates retracta, retractz together with asserti and retracti in P++ enhance this feature. The following example shows how one can use them.

:-retracta(ex_6/2).
:-retractz(ex_6/2).

The query retracta removes the first clause in ex_6/2 that is Bob's sign-up. Also retractz removes the last clause in ex_6/2 that is Jeffery's sign-up. So there are eight people still in the waiting list. The first one is Jack and the last one is Mary.

Built-in predicates asserta and assertz are modified so that the symbol ":-" is no longer needed when a rule (with both head and body) is referred. The symbol ":-" is classified as a logic link in P++ software and does not take part in an argument of any clause.

Now suppose that one wants to insert a rule "legs (A,6) :-insect(A)." at the very beginning of the predicate legs/2. The following compares how this is done with asserta in ISO/IEC Prolog and asserta in P++ software.

Example in ISO/IEC Prolog:
    asserta((legs(A,4):-animal(A))).
Example in P++ software:
    asserta(legs(A,4), animal(A)).

The discrepancy seems small. However, in P++ the symbol ":-" is classified as a logic link. It does not take part in an argument of any clause. It means the symbol ":-" is not a predicate anymore and it will not appear in the argument position as a whole or as a part wherein. This is one major change made in P++ software on the base of ISO/IEC Prolog. In mathematical logic, logic statements are linked with "AND", "OR", and "NOT". If these logic links are allowed to be predicates that means "AND", "OR", and "NOT" are viewed the same as logic statements. The discussion on assertz is similar to the above asserta.

Figure 10:
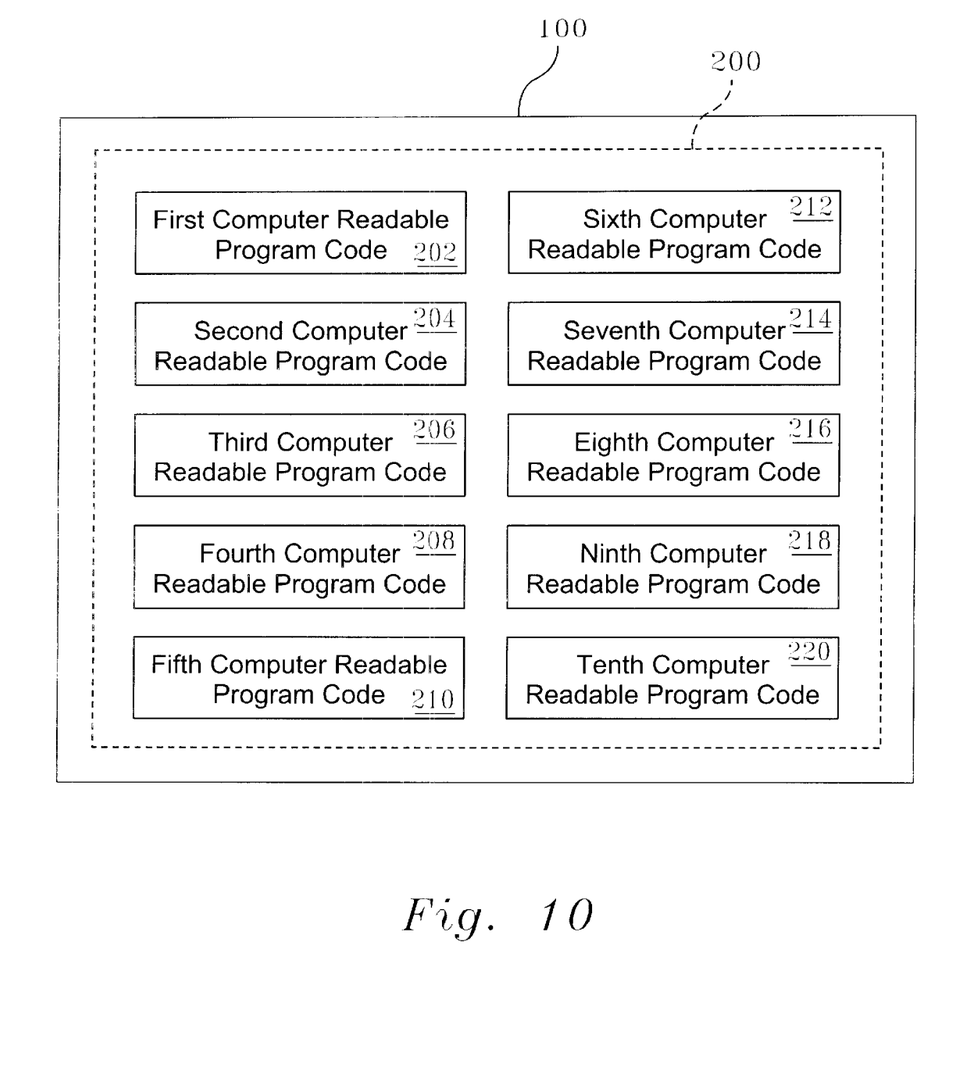
FIG. 10 is a block diagram of a computer readable medium having computer readable programming code means embodied therein according to the invention.

FIG. 10 illustrates a computer readable medium 100 with computer readable programming code means 200 embodied therein for use on a computer system. The computer readable program code means 200 includes first computer readable program code 202, second computer readable program code 204, third computer readable program code 206, fourth computer readable program code 208, fifth computer readable program code 210, sixth computer readable program code 212, seventh computer readable program code 214, eighth computer readable program code 216, ninth computer readable program code 218, and tenth computer readable program code 220.

The first computer readable program code 202 defines a set of predicate-style clauses where each clause is either a fact about given information or a rule about how a solution may relate to or be inferred from given facts. The second computer readable program code 204 defines a query as a each clause against an existing program. The third computer readable program code 206 defines first and second structure types for arguments of clauses for both the first and second computer readable programming code. The fourth computer readable program code 208 defines a third structure type as being one of the first and second structure types, a list, or a compound term. The fifth computer readable program code 210 defines a data term as an atom, a number, or a quoted string.

The sixth computer readable program code 212 defines a hierarchical structure or a hierarchical structure type as one in which the outmost structure is a third structure type. The seventh computer readable program code 214 defines a variable which can be instantiated to a data term or a hierarchical structure at runtime. The eighth computer readable program code 216 defines a term as a data term, a hierarchical structure, or a variable. The ninth computer readable program code 218 defines a fourth structure type which is hierarchically defined so that each of its members can be a variable, a data term, or a hierarchical structure type except itself, and wherein the fourth structure type is recursively processed so that any variable residing in its members at any level within a hierarchical structure can be substituted or replaced by one of its own types making a result in the same structure type with a different length at that level, or by a data term, or by other structure types through instantiation.

The tenth computer readable program code 220 defines a fifth structure type which is recursively defined so that each of its members can be a term including a hierarchical structure of its own type and can be a member or members of any hierarchical structure type including itself, wherein each structure in this structure type has a fixed length throughout inputting, storing, processing, and outputting, and wherein the fifth structure type is recursively processed so that any variable residing in its members at any level within a hierarchical structure can be substituted or replaced by a term through instantiation.

It is to be understood that the present invention is not limited to the embodiments described above, but encompasses any and all embodiments within the scope of the following claims.

I claim:

1. A computer readable medium having computer readable programming code means embodied therein for use on a computer system, said programming code means comprising:

first computer readable programming code defining a set of predicate-style clauses where each clause is selected from the group consisting of a fact about given information, a rule about how a solution may relate to given facts, and a rule about how a solution may be inferred from given facts;

second computer readable programming code defining a query as a set of clauses preceded by question mark followed by a dash, which causes an execution to satisfy each clause against an existing program;

third computer readable programming code defining first and second structure types for arguments of clauses for both the first and second computer readable programming code;

fourth computer readable programming code defining a third structure type as being selected from the group consisting of the first structure type, the second structure types, a list, and a compound term;

fifth computer readable programming code defining a data term as in a form selected from the group consisting of an atom, a number, and a quoted string;

sixth computer readable programming code defining one of the group consisting of a hierarchical structure and a hierarchical structure type as one in which the outmost structure is a third structure type;

seventh computer readable programming code defining a variable which can be instantiated at runtime to a form selected from the group consisting of a data term and a hierarchical structure;

eighth computer readable programming code defining a term in a form selected from the group consisting of a data term, a hierarchical structure, and a variable;

ninth computer readable programming code defining a fourth structure type which is hierarchically defined so that each of its members is selected from the group consisting of a variable, a data term, and a hierarchical structure type, and wherein the fourth structure type is recursively processed; and, tenth computer readable programming code defining a fifth structure type which is recursively defined so that each of its members is selected from the group consisting of a term including a hierarchical structure of its own type and any hierarchical structure type including itself, wherein each structure in this structure type has a fixed length throughout inputting, storing, processing, and outputting, and wherein the fifth structure type is recursively processed.

2. The computer readable medium according to claim 1, wherein each argument of a predicate-style clause is checked for structure types during predicate inputting, storing, data binding, and outputting, and if the predicate-style clause belongs to said fourth structure type or said fifth structure type, then the definition of the structure type is used and the argument is processed accordingly.

3. The computer readable medium according to claim 1, wherein said fourth structure type is identified by a designated functor defined as two successive periods in quotes.

4. The computer readable medium according to claim 1, wherein during predicate inputting and outputting, when the fifth structure is tuple-like and formed as a sequence of terms, the sequence is enclosed by parentheses.

5. The computer readable medium according to claim 1, wherein said fifth structure type is identified by a designated functor defined as three successive periods in quotes.

6. The computer readable medium according to claim 1, wherein said ninth computer readable programming code provides a means for reading a sequence of terms, wherein one space separates one term from another.

7. The computer useable medium according to claim 1, wherein said ninth computer readable programming code and said tenth computer programming code provide a means for carrying out algebraic operations to matrices including addition, subtraction, and multiplication.

8. A computer-implemented method for facilitating the execution of a set of instructions encoded from an implementation of Prolog programming code on a computer system having a processor, a memory, and registers, said method comprising the steps of:

providing first computer readable programming code defining a first structure type which is hierarchically defined so that each of its members is selected from the group consisting of a variable, a data term, and a hierarchical structure type, and wherein the first structure type is recursively processed;

providing second computer readable programming code defining a second structure type which is recursively defined so that each of its members can be a term including a hierarchical structure of its own type, wherein each structure in this structure type has a fixed length throughout inputting, storing, processing, and outputting, and wherein the second structure type is recursively processed; and, carrying out algebraic operations to matrices including addition, subtraction, and multiplication with said first computer readable programming code and said second computer readable programming code.

9. The method according to claim 8, wherein said first computer readable programming code provides a means for reading a sequence of terms, wherein one space separates one term from another.

10. The method according to claim 8, wherein said first computer programming code provides a functor defined as two successive periods in quotes.

11. The method according to claim 8, wherein said second computer readable programming code provides a means for causing said processor to read a sequence of terms separated by commas, wherein said sequence is enclosed by parentheses.

12. The method according to claim 8, wherein said second computer readable programming code provides a means for causing said processor to read a fixed number of members.

13. The method according to claim 8, wherein said second computer readable programming code provides a functor defined as three successive periods in quotes.

14. A computer system for processing enhanced Prolog programming code, wherein said computer system comprises:

a processor, a memory coupled to said processor;

registers coupled to said processor;

a computer readable medium coupled to said memory, said computer readable medium storing a computer program having executable code for said processor, said computer program comprising:

first computer readable programming code defining a set of predicate-style clauses where each clause is selected from the group consisting of a fact about given information, a rule about how a solution may relate to given facts, and a rule about how a solution may be inferred from given facts;

second computer readable programming code defining a query as a set of clauses preceded by question mark followed by a dash, which causes an execution to satisfy each clause against an existing program;

third computer readable programming code defining first and second structure types for arguments of clauses for both the first and second computer readable programming code;

fourth computer readable programming code defining a third structure type as being selected from the group consisting of the first structure type, the second structure types, a list, and a compound term;

fifth computer readable programming code defining a data term in a form selected from the group consisting of an atom, a number, and a quoted string;

sixth computer readable programming code defining one of the group consisting of a hierarchical structure and a hierarchical structure type as one in which the outmost structure is a third structure type;

seventh computer readable programming code defining a variable which can be instantiated at runtime to a form selected from the group consisting of a data term and a hierarchical structure;

eighth computer readable programming code defining a term in a form selected from the group consisting of a data term, a hierarchical structure, and a variable;

ninth computer readable programming code defining a fourth structure type which is hierarchically defined so that each of its members is selected from the group consisting of a variable, a data term, and a hierarchical structure type, and wherein the fourth structure type is recursively processed; and, tenth computer readable programming code defining a fifth structure type which is recursively defined so that each of its members is selected from the group consisting of a hierarchical structure of its own type and hierarchical structure type including itself.

15. The computer system according to claim 14, wherein s computer readable programming code provides a means for causing said processor to read a sequence of terms, wherein one space separates one term from another.

16. The computer system according to claim 14, wherein said ninth computer readable programming code provides a functor defined as two successive periods in quotes.

17. The computer system according to claim 14, wherein said tenth computer readable programming code provides a means for causing said processor to read a sequence of terms separated by commas, wherein said sequence is enclosed by parentheses.

18. The computer system according to claim 14, wherein said tenth computer readable programming code provides a means for reading a fixed number of members.

19. The computer system according to claim 14, wherein said tenth computer readable programming code provides a functor defined as three successive periods in quotes.

20. The computer system according to claim 14, wherein said ninth computer readable programming code and said tenth computer readable programming code provide a means for causing said processor to carry out algebraic operations to matrices including addition, subtraction, and multiplication.

* * * * *